NOISE BALANCED AFC SYSTEM

Filed Aug. 1, 1963 2 Sheets-Sheet 1

INVENTORS:
ALEX C. LATKER,
GEORGE D. ROSE JR.,
BY David Blumenfeld
THEIR ATTORNEY.

INVENTORS:
ALEX C. LATKER,
GEORGE D. ROSE JR.,
BY D. David Blumenfeld
THEIR ATTORNEY.

United States Patent Office 3,281,698

Patented Oct. 25, 1966

3,281,698

NOISE BALANCED AFC SYSTEM

George Daniel Rose, Jr., and Alex Charles Latker, Lynchburg, Va., assignors to General Electric Company, a corporation of New York Filed Aug. 1, 1963, Ser. No. 299,308
8 Claims. (Cl. 325—420)

This invention relates to an automatic frequency control (AFC) system. More particularly, it relates to a communication receiver incorporating a self-centering AFC system which is continuously adjusted to eliminate or minimize erratic operation due to noise.

Although the instant invention is generally applicable to radio receivers of any type, it is particularly useful in connection with communication receivers and will, therefore, be described in this context. It will, of course, be understood that the invention is of more general application and is as applicable to broadcast or other types of receivers as it is to communication receivers.

Automatic frequency control circuits are quite frequently included in communication receivers to maintain stable operation of the local oscillator by continuously correcting for any drift of the local oscillator frequency from the desired value. Typically, such AFC systems include a feedback control loop wherein a detector-discriminator is utilized to produce an error signal in response to any frequency shift of the IF signal from the desired value. This error signal is then fed back to the local oscillator to adjust its frequency, and hence the IF signal frequency, thereby constraining the entire system to operate at the desired point. Under certain conditions, however, the AFC system itself may become erratic, thereby erroneously shifting the local oscillator frequency from the desired value. This erratic operation of AFC systems is particularly severe under conditions of high noise levels. Thus, for example, this condition may exist when the signal-to-noise ratio is quite poor (as might be the case in tropospheric scatter communication where very weak signals are received), or if signal reception is intermittent (as would be the case in mobile radio communications, for example), or if the transmitted signal is subject to severe fading. In all of these situations the noise level in the receiver tends to rise substantially. This noise is random in nature, and the frequency amplitude distribution is not equal over the receiver IF passband. Thus, the center frequency of the noise energy in the IF band does not, under normal circumstances, coincide with the center frequency of the IF band and the center frequency of the detector discriminator. Consequently, the discriminator develops an error voltage proportional to this frequency difference. This error voltage, of course, does not really represent any frequency drift of the local oscillator and causes a spurious shift of the local oscillator frequency from the desired value. The shift of the local oscillator frequency, of course, has no correcting effect on the noise distribution in the IF band since that is completely random and independent of the local oscillator frequency. This spurious error signal may be sufficiently large to shift the local oscillator frequency completely out of the dynamic range of the discriminator so that an input signal to the receiver, when heterodyned or mixed with the local oscillator signal, falls entirely out of the receiver IF passband. The signal may, therefore, be incapable of actuating the AFC system to return the local oscillator frequency to the desired value.

It is, therefore, one of the principal objects of this invention to provide a receiver having an automatic frequency control loop which is balanced for noise.

Another object of this invention is to provide an automatic frequency control system for a communication receiver wherein the effects of noise on the system are balanced out by adjusting the center frequency of the received noise energy.

Yet another object of this invention is to provide an automatic frequency control system in a communication receiver wherein the system always locks in at the center frequency of the detector discriminator in spite of the frequency distribution of the noise energy.

Other objects and advantages of the instant invention will become apparent as the description thereof proceeds.

Briefly speaking, the various advantages and objectives are achieved, and the invention is practiced by continually adjusting the IF passband so that the center frequency of the noise energy in the IF passband coincides with the center frequency of the AFC system discriminator detector. To this end, an electrically tuned filter is located ahead of the limiter, and the discriminator detector and the resonant frequency of the filter is varied in a direction such that the noise energy over the passband is balanced, and the noise energy center frequency, in the absence of an input signal, coincides with the discriminator center frequency, thereby cancelling out the effect of the noise and maintaining the local oscillator frequency substantially at the correct frequency.

The features of this invention, which are believed to be novel, are set forth with particularity in the appended claims.

The invention itself, however, both as to its organization and method of operation, together with further objects and advantages thereof, may best be understood by reference to the following description taken in connection with the accompanying drawings wherein.

Figure 1:
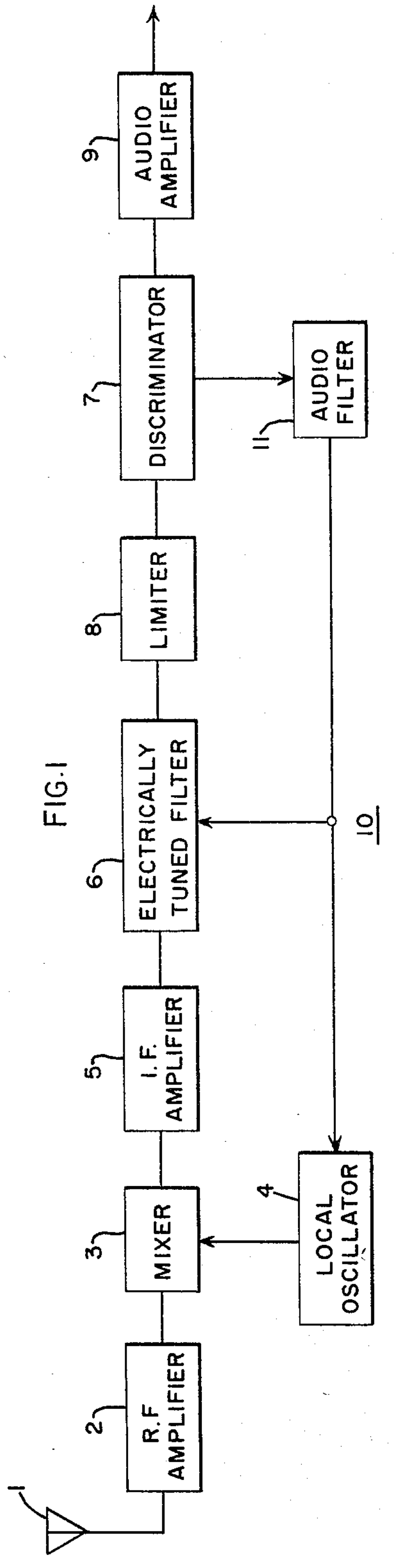
FIG. 1 is a block diagram of a communication receiver constructed in accordance with the invention.

FIG. 1 illustrates, in block diagram form, a communication receiver constructed in accordance with the instant invention which includes an automatic frequency loop for the receiver local oscillator and a further control loop operated from the AFC loop for continuously adjusting the center frequency of the noise energy in the IF band to cause it to coincide with the center frequency of the AFC detector. The received signal at the antenna 1 is amplified in one or more amplifying stages 2 and applied to the input of a mixer 3. The amplified RF signal is mixed or heterodyned with the signal from a local oscillator 4 to produce an intermediate frequency (IF) signal at the output of the mixer. The IF signal is amplified in one or more intermediate frequency amplifying stages 5 and applied to an electrically tunable filter element 6. The electrically tunable filter 6, as will be explained in detail presently, has its passband varied in a direction such that the energy distribution of the noise energy in the band coincides with the center frequency of a discriminator detector 7 which is coupled to the tuned filter through a limiter 8. Discriminator 7 recovers the intelligence contained in the frequency modulated IF signal and produces at one output thereof the audio frequency information which is applied to one or more audio amplifier stages 9 and then to a utilization means such as a speaker, etc.

The AFC system, shown generally at 10, provides a feedback loop between a second output of the discriminator 7 and local oscillator 4 to control the local oscillator frequency and maintain it at the proper frequency for recovery of the information in the received signal. That is, if the local oscillator frequency drifts from the desired value, there is produced at the output of the discriminator a control signal, the magnitude and polarity of which is proportional to the deviation of the IF frequency, due among other things to a shift in the local oscillator frequency, from the desired value. The output signal from the discriminator is passed through an audio filter 11 which filters out the audio information recovered from the signal and passes only the error signal to the input of the local oscillator 4 to shift its frequency to the desired value. The local oscillator includes, as is customary in systems of this type, a frequency controlling circuit or network, such as a reactance tube, voltage variable reactance, etc., which varies the frequency of the local oscillator in response to the error signal from the discriminator. The manner in which the discriminator produces the desired error voltage and the manner in which this error voltage is utilized to shift local oscillator frequency is old and well known in the art, and no detailed description thereof is necessary at this point. Suffice it to say, the magnitude and polarity of the error signal is such as to return the local oscillator frequency to the desired value at which time the output from the discriminator goes to zero.

As was pointed out briefly before, if the incoming signal to the receiver disappears, as would be the case during intermittent operation of the communication system, or the occurrence of a signal fade, etc., the noise level in the receiver, due to the various components of the receiver, rises substantially. This noise signal, which passes through IF amplifier 5, electrically tuned filter 6 and limiter 8 to discriminator 7 is characterized by the fact that the noise energy distribution over the receiver IF passband is not necessarily symmetrical with respect to the center frequency of the IF passband and the center frequency of the discriminator, at which the discriminator puts out a zero error voltage. Because of this asymmetrical distribution, the noise energy in the IF band above the discriminator center frequency does not equal the noise energy in the IF band below the discriminator center frequency, and the discriminator produces an error voltage proportional to the difference between the discriminator center frequency and the apparent center frequency of the noise energy, (i.e., that frequency at which the noise energies above and below it in frequency are equal). This error signal is applied to the local oscillator and shifts its frequency by an amount proportional to the magnitude of the error signal and in a direction determined by the polarity of the noise induced spurious error signal. The noise energy received by the discriminator may thus shift the local oscillator frequency sufficiently so that upon receipt of a signal the new IF frequency falls entirely out of the discriminator range, thereby seriously interfering with the operation of the receiver.

To correct for this noise induced error signal and to recenter the AFC system, the error signal from the discriminator 7 and audio filter 11 is also applied to the input of electrically tuned filter 6. The error signal, due to the noise signal from the discriminator, detunes the electrical filter 6 and shifts the IF passband of the filter in a direction and by an amount such that the noise energy distribution in the bands above and below the discriminator center frequency are equal, and the error voltage output from the discriminator goes to zero permitting the local oscillator to return to the desired frequency. When the discriminator output goes toward zero, returning the local oscillator to its predetermined frequency, the control signal to the electrically tunable filter 6 also goes to zero, and the passband of the filter returns to the original value. If the noise energy distribution in the IF band is still asymmetrical, another error signal is produced which again detunes the filter and produces balance. Thus, the system continually readjusts itself to drive the discriminator output to zero and to maintain the local oscillator frequency within the dynamic range of the discriminator.

If the loop gain of the system which includes the local oscillator is made substantially larger than the loop gain of the system which includes the electrically tuned filter 6, then the composite system will, in effect, operate at a normal AFC system when the signals are received. When no signals are received the electrically tuned filter is continually adjusted to drive the AFC system towards the center frequency of the discriminator, thereby maintaining the local oscillator frequency within the dynamic range of the discriminator and ready to receive a signal. In the absence of such an arrangement, as pointed out above, the local oscillator frequency could very well be shifted by the spurious noise output from the discriminator to a value completely outside of the dynamic range of the discriminator and the AFC circuit thereby preventing the AFC circuit from capturing the signal and adjusting the local oscillator frequency to the proper value once a signal is received.

Figure 2:
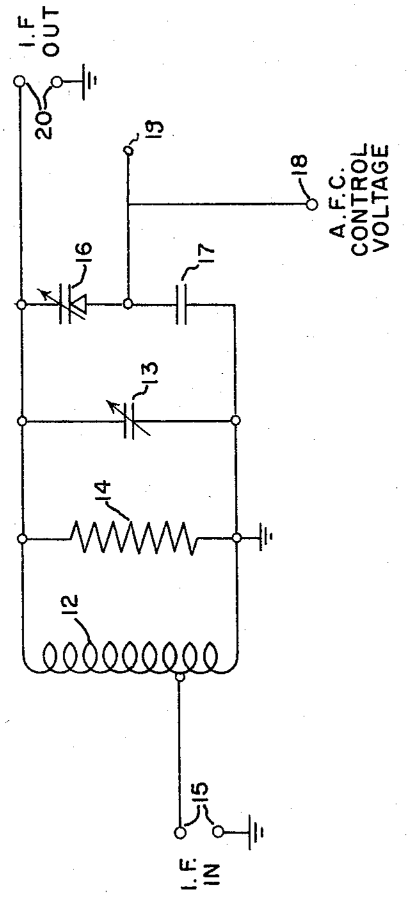
FIG. 2 is a circuit diagram of the electrically tunable filter of the receiver of FIG. 1.

FIG. 2 illustrates one form of the electrically tuned filter which may be utilized in the novel circuit arrangement of this invention. The electrically tuned filter consists of a parallel resonant circuit including an inductance 12 and a variable capacitor 13 connected in shunt therewith. A shunting resistance 14 is connected in parallel with inductance 12 and capacitance 13 and loads the resonant circuit sufficiently to establish the desired quality factor Q, hence the bandwidth of the filter. The IF input signal to the resonant circuit is supplied over a pair of terminals 15, one of which is grounded and the other of which is connected directly to a tap on inductance 12. Connected in shunt with the present circuit is a voltage variable capacitor device 16, customarily referred to as a "Varactor." The AFC error voltage from the discriminator is applied to the junction of the varactor 16 and an RF by-pass capacitor 17 while a fixed biasing voltage for reverse biasing the varactor to its reference point is impressed on terminal 19. At IF frequencies varactor 16 is in shunt with capacitor 13 and capacity variations in response to the unidirectional error voltage at terminal 18 vary the resonant frequency of the circuit and shifts the passband of this filter in the proper direction. The output from the electrically tunable filter is coupled from output terminals 20 to the limiter 8 and thence to discriminator 7 of the receiver illustrated in FIG. 1.

Voltage sensitive capacitors or varactors, such as illustrated schematically at 16, are zero or reverse biased P-N junctions that are characterized by the fact that a region depleted of mobile charge carrier exists on either side of the junction. This region or layer, which is sometimes referred to as the "depletion layer," is bounded on either side by the P and N type conductivity materials. The junction, therefore, effectively constitutes a capacitance since it represents an insulator (i.e., a layer substantially free of charge carriers) bound on either side by the semiconductive layers. The width of the depletion layer, and hence the capacitance of the device, varies inversely with the applied voltage, and these variations change the passband of the electrically tunable filter 11 illustrated in FIG. 2. A fixed bias establishes the normal operating point of the varactor, and the AFC control voltage varies the amount of reverse biasing and hence the capacitance of the varactor. It will be understood, by those skilled in the art, that other types of electrically tunable filters may be utilized and that a varactor, as used in conjunction with a resonant circuit, is merely one embodiment of such a device.

The operation of the system and the manner in which the electrically tuned filter maintains the local oscillator frequency within the dynamic range of the discriminator may best be understood by reference to the graphs of FIGS. 3–8.

Figure 3:
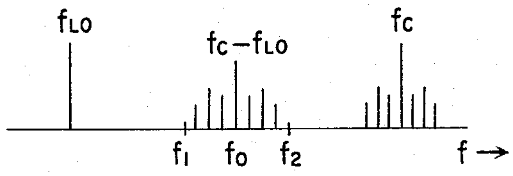
FIGS. 3–8 are graphs useful in understanding the manner in which the instant invention operates.
Figure 4:
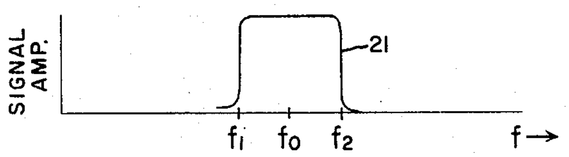

FIG. 3 illustrates the frequency spectrum of a received FM signal having carrier frequency $f_c$. The instantaneous frequency deviates from the carrier frequency and produces a number of sidebands which represent the transmitted intelligence. The received signal $f_c$ and its sidebands are converted to an intermediate frequency by mixing or heterodyning it with a local oscillator signal $f_{LO}$ to produce an IF signal $f_c - f_{LO}$, falling within the IF passband $f_2-f_1$. The center frequency of the IF signal coincides with the center frequency of the IF passband ($f_c-f_{LO}=f_0$), and the FM sidebands of interest fall within this passband. A typical response curve 21 for the IF section of the receiver is illustrated in FIG. 4, and all frequencies falling within the passband are substantially unattenuated while frequencies outside of the passband are attenuated.

Figures 5, 6:
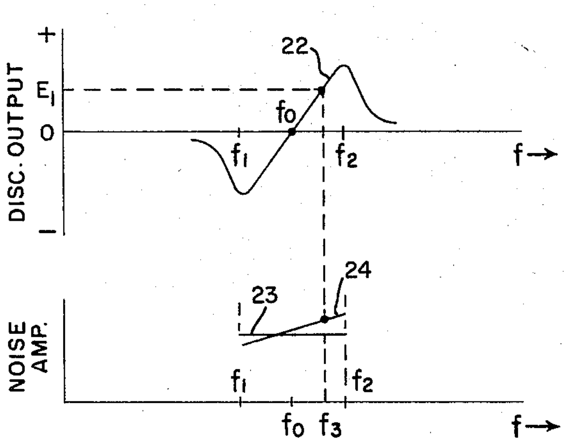

FIG. 5 illustrates a typical discriminator curve 22 having a dynamic or linear range between $f_1$ and $f_2$. The center frequency $f_0$ coincides with the desired IF center frequency. Any deviation of the IF signal from $f_0$ produces a unidirectional signal, the polarity of which is a function of the direction of the instantaneous frequency deviation, and the magnitude of which is proportional to the magnitude of that deviation. In other words, the discriminator, as is well known, converts frequency variations to amplitude variations thereby extracting the audio or other information from the FM signal. These audio signals are, of course, filtered by audio filter 6 of the AFC loop of FIG. 1 and do not affect the AFC loop. If the center frequency of the IF signal deviates from $f_0$, as a result of a shift in local oscillator frequency, a steady state or slowly varying undirectional signal, proportional to that deviation, is produced, and it is this signal which is utilized in the AFC loop to shift the frequency of the local oscillator. If, on the other hand, the center frequency of the received signal in the IF band coincides with $f_0$, there is no unndirectional error signal, and the local oscillator remains at its predetermined frequency.

In the absence of an input signal to the receiver the IF signal disappears, and theoretically the discriminator output should go to zero. However, in the absence of an input signal the noise level in the receiver rises substantially. The IF stages and the electrically tunable filter pass those noise components lying in the IF passband. The frequency-energy distribution of this noise, however, is often not constant across the passband.

FIG. 6 illustrates graphically one possible, if slightly idealized, form of the noise distribution across the passband with frequency plotted along the abscissa and noise amplitude along the ordinate. It will be seen that in the IF passband $f_2-f_1$ the noise energy distribution with frequency is *not constant,* as shown by the constant amplitude curve 23, but usually has a slope as shown by curve 24. This simply means that the noise energy in the frequency band $f_0-f_1$ does not equal the noise energy in the band $f_2-f_0$. The center frequency for the noise, that is the frequency at which the noise energies are equal, is at some frequency $f_3$ which does not coincide with the center frequency $f_0$ of the discriminator dynamic range. The discriminator sees the received noise as if it were a signal having a center frequency $f_3$, and as a result the discriminator produces a positive unidirectional output voltage $E_1$ proportional in magnitude and polarity to the amount and direction of the frequency difference.

In FIG. 6 this center frequency $f_3$ for the noise band is greater than $f_0$. This, of course, is due to the fact that the slope of the noise distribution, as illustrated, increases with frequency. It will be obvious that the noise center frequency may equally well be at some frequency $f_3$ less than $f_0$.

Figure 7:
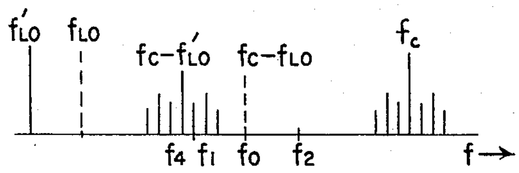

The error voltage $E_1$ is fed back to the oscillator and shifts the oscillator in a direction to reduce the local oscillator frequency by an amount equal to the difference between $f_0$ and $f_3$. Thus, as illustrated in FIG. 7, the local oscillator frequency $f_{LO}$ is shifted to a new lower value $f'_{LO}$. If an input signal is now received, the IF center frequency is no longer at $f_0$ but at some value $f_4$ which is outside of the IF passband and completely out of the dynamic range of the discriminator. This affects the lock-in sensitivity of the AFC system so that it will return the local oscillator to the desired frequency $f_0$ only if a very strong signal is present.

However, the interposition of the electrically tunable filter between the IF amplifier and the discriminator-limiter combination ameliorates this problem and maintains the local oscillator frequency within the discriminator dynamic range and substantially at the center frequency $f_0$. That is, the error signal $E_1$ generated at the output of the discriminator due to the unsymmetrical noise distribution within the IF passband is also applied degeneratively to the electrical tuned filter and shifts the passband of that filter from the IF passband $f_2-f_1$ to a different value of passband $f_6-f_5$ which is so located that the center frequency of the noise band, i.e., that point in which the noise energy is above and below that frequency are equal, coincides with the disciminator center frequency $f_0$.

Figure 8:
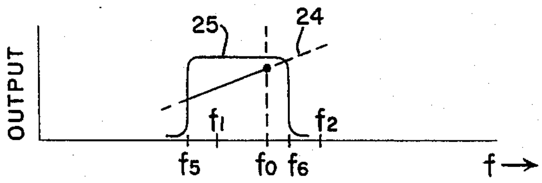

This may be seen by reference to FIG. 8 where the output of the filter is plotted along the ordinate and frequency along the abscissa. The passband of electrically tuned filter 6, as illustrated by curve 25, has been shifted from $f_2-f_1$, which is the nominal or normal passband of the IF stages to a new value $f_6-f_5$. However, because of the rising slope of curve 24, which represents the noise amplitude frequency variations, the noise energy in a band $f_6-f_0$ is now equal to the noise energy in a band $f_0-f_5$ even though the $f_0-f_5$ band is very much larger than the $f_6-f_0$. The passband is varied in a manner such that in the absence of an input signal the center frequency of the noise energy is adjusted to coincide with the center frequency of the AFC discriminator. The output of the discriminator goes to zero, returning the local oscillator frequency to the desired value $f_{LO}$.

When the output signal from the discriminator goes to zero the passband of filter 6 is returned to its nominal value $f_2-f_1$. If the slope of the noise-energy distribution is still such that the center frequency of the noise energy in the IF band $f_2-f_1$ does not coincide with the center frequency $f_0$ of the discriminator, the discriminator again produces an output signal which starts to shift the local oscillator frequency to a value other than $f_0$. However, the error signal is again applied degeneratively to the electrically tuned filter shifting the filter passband which again drives the output of the discriminator to zero and the local oscillator back toward its desired frequency. The system thus continuously adjusts itself to maintain the local oscillator frequency within the dynamic range of the discriminator, thereby maintaining the AFC circuit operative to lock the local oscillator in whenever there is an input signal to the receiver.

With an input signal to the receiver the system operates as a normal AFC system since the loop gain of the AFC system, which includes discriminator 7, audio filter 11, and the local oscillator 4, is much larger than the gain of the filter-centering loop, including discriminator 7, audio filter 11, and electrically tuned filter 6. Hence, the automatic frequency control changes produced by any deviation of the input signal overcome the effects of the loop controlling the electrically tuned filter. However, in the absence of such a signal and the presence of noise, the loop, including the electrically tuned filter 6, is effective to stabilize the AFC system.

From the foregoing description, it is apparent that a stable automatic frequency control circuit may be obtained which counteracts the effects of noise during those intervals when no input signal is received. This noise balancing effect is achieved by continually adjusting the IF passband so that the center frequency of the noise spectrum coincides with the center frequency of the discriminator range, thereby preventing a spurious shift of the local oscillator frequency in response to the noise signal. In this manner, the local oscillator frequency is maintained in the dynamic operating range of the discriminator so that the appearance of the input signal permits the AFC circuit arrangement to operate in its normal and useful manner.

Although a particular embodiment of the invention has been shown, it will, of course, be understood that it is not limited thereto since many modifications in this circuit arrangement may be made. It is contemplated by the appended claims to cover any such modifications as fall within the true spirit and scope of this invention.

What is claimed as new and desired to be secured by Letters Patent of the United States is:

1. In a receiver for modulated signals, a frequency control system comprising a signal path including a local oscillator, and means for converting an incoming modulated signal to an intermediate frequency signal, means to control the frequency of said local oscillator and thereby maintain the intermediate frequency band centered at a desired value including discriminator means in the signal path of said receiver for producing an error signal proportional to the deviation and direction of deviation of the intermediate frequency signal from the desired center value, a feedback loop means including said discriminator, the output of said discriminator being coupled to said local oscillator to control the local oscillator in response to said error signal and maintain the intermediate frequency signal at the desired value, means to prevent said discriminator from producing an error signal in response to noise in the intermediate frequency band including means responsive to the error signal for varying the center frequency of the intermediate frequency passband whereby the noise energy in the passband is balanced with respect to the desired center value of the intermediate frequency signal and the discriminator output due to noise is zero.

2. In a receiver for a modulated signal, an automatic frequency control system for the local oscillator of the receiver comprising an automatic frequency control loop including the local oscillator and a discriminator for producing an error signal in response to any frequency deviation of the local oscillator, means for coupling the error signal from said discriminator to said local oscillator, means to prevent an output from said discriminator due to noise in the discriminator frequency response range including means to vary tthe frequency range of the noise applied to said discriminator until the noise energy distribution is balanced, and the discriminator output due to noise is reduced to zero.

3. In an automatic frequency control system for a receiver, the combination comprising means including a local oscillator for converting an incoming modulated signal to an intermediate frequency signal, means to control the frequency of said local oscillator to maintain the intermediate frequency band centered at a desired value including discriminator means for producing an error signal in response to any deviation of intermediate frequency signal from the desired center value, including means for coupling said error signal to said local oscillator to vary its frequency in response thereto, and to maintain the intermediate frequency signal at the desired value, electrically variable filter means coupled between said signal converting means and said discriminator, said filter having a nominal passband equal to and centered at the said desired value, means to vary the center frequency of the passband of said electrical filter in response to any noise produced error signals from said discriminator until the noise energy distribution in the passband is balanced, and the discriminator output due to noise is reduced to zero.

4. The automatic frequency control system, according to claim 3, wherein said electrically variable filter includes a variable tuned circuit, an electrically variable capacitor forming part of said tuned circuit, and means for impressing the error signal from said discriminator on said electrically variable capacitor thereby changing the tuning and hence the center frequency of the passband of said filter.

5. In an automatic frequency control system, the combination comprising an oscillator, frequency converting means coupled to said oscillator for translating the oscillator frequency to different value, means for producing an error signal in response to any frequency deviation of the oscillator and a shift of the translated frequency from the desired value, means coupling said error signal to said oscillator to control the frequency of said oscillator, electrically variable filter means coupled between said frequency converting means and said error signal producing means, means for coupling said error signal to said filter for varying the center frequency of the passband of said filter to balance out noise signals applied to said discriminator.

6. In an automatic frequency control system for a receiver, the combination comprising a local oscillator, a mixer, means for impressing an input signal and a signal from said local oscillator on said mixer to produce a band of intermediate frequency signals, amplifying means for said intermediate frequencies having a passband coextensive with the nominal passband of said intermediate frequency signals, a discriminator coupled to the output of said amplifier means for producing an output proportional to any deviation of said signals from the center frequency of said nominal passband to extract the intelligence from said signals and to produce an error signal proportional to the steady state deviation of said signals from the center frequency of said nominal passband, feedback means between said discriminator and said oscillator for controlling the oscillator and the intermediate signal frequencies in response to said error signals including filter means to filter out the intelligence extracted by said discriminator and prevent application of the intelligence to the oscillator, means to control the output from said discriminator to prevent error signals due to noise energy unbalance in the intermediate frequency passband including an electrically variable filter coupled between said amplifying means and said discriminator, said filter having a nominal passband coextensive with the intermediate frequency signal passband, means for coupling the output of said discriminator to said electrically variable filter to apply the error signals from said discriminator to said electrically variable filter to shift the center frequency of the passband of said filter until the output of said discriminator due to noise energy unbalance in the intermediate frequency passband is reduced to zero.

7. In a noise-immune automatic frequency control system for controlling the local oscillator of a receiver, the combination comprising an automatic frequency control loop including the local oscillator, a mixer coupled to the oscillator, and a discriminator coupled to the mixer for producing an error signal in response to any frequency deviation of the local oscillator, a noise balancing loop for preventing an output from the discriminator due to unbalance in noise energy distribution in the discriminator frequency response range including an electrically variable filter coupled between tthe mixer and discriminator and means for coupling the error signal output from said discriminator to said filter for varying the frequency range of the noise applied to the discriminator until the noise energy distribution is balanced, and the discriminator output due to noise is reduced to zero.

8. The automatic frequency control system, according to claim 7, wherein the loop gain of the automatic frequency control loop is greater than the loop gain of the noise balancing loop whereby the automatic frequency control loop overcomes the effect of the noise balancing loop upon receipt of an input signal by the receiver.

No references cited.

KATHLEEN H. CLAFFY, *Primary Examiner.*

R. LINN, *Assistant Examiner.*